United States Patent [19]

Clebant

[11] Patent Number: 4,647,227
[45] Date of Patent: Mar. 3, 1987

[54] BEARING, SUCH AS FOR ROTARY SHAFT

[75] Inventor: Jean-Claude Clebant, Carbon Blanc, France

[73] Assignee: Societe Anonyme: Societe Europeenne de Propulsion, Puteaux, France

[21] Appl. No.: 823,195

[22] Filed: Jan. 28, 1986

[30] Foreign Application Priority Data

Jan. 28, 1985 [FR] France .................. 85 01129

[51] Int. Cl.⁴ .................. F16C 17/06; F16C 33/66
[52] U.S. Cl. .................. 384/99; 384/119; 384/308; 384/904
[58] Field of Search .................. 384/99, 100, 103–106, 384/117, 248, 119, 251, 122, 261, 124, 274, 125, 302, 154, 192, 306, 202, 308, 215, 309, 223, 310, 224, 312, 247, 428, 904; 308/DIG. 12

[56] References Cited

U.S. PATENT DOCUMENTS

| 1,117,500 | 11/1914 | Kingsbury | 384/308 |
|---|---|---|---|
| 1,349,157 | 8/1920 | Kingsbury | 384/125 |
| 1,425,979 | 8/1922 | Kingsbury | 384/224 |
| 2,614,896 | 10/1952 | Pierce, Jr. | 384/99 |
| 2,636,790 | 4/1953 | McNally | 384/99 |
| 3,160,450 | 12/1964 | Gentiluomo | 384/308 |
| 3,424,505 | 1/1969 | Pizzitola | 384/119 |
| 3,499,691 | 3/1970 | Baier | 384/119 |
| 4,257,495 | 3/1981 | de Brie Perry | 384/215 X |
| 4,506,998 | 3/1985 | Showalter | 384/312 |

FOREIGN PATENT DOCUMENTS

| 0128747 | 12/1984 | European Pat. Off. . | |
|---|---|---|---|
| 1342910 | 10/1963 | France . | |
| 2143405 | 2/1973 | France . | |
| 203601 | 10/1983 | German Democratic Rep. | 384/99 |
| 1172016 | 11/1969 | United Kingdom . | |
| 1237161 | 6/1971 | United Kingdom . | |

*Primary Examiner*—Stuart S. Levy
*Assistant Examiner*—Thomas R. Hannon
*Attorney, Agent, or Firm*—Staas & Halsey

[57] ABSTRACT

Bearing for rotary shaft, of the type comprising at least one bearing element with a friction surface contacting with one external surface of the shaft. The bearing element comprises a bearing block on which is defined the friction surface and a support housing having an opening for receiving the block. The block and the housing are separated over the whole periphery of the opening by a gap, and joined together resiliently through the gap. The block and housing together define a closed cavity filled with a substantially incompressible fluid.

8 Claims, 7 Drawing Figures

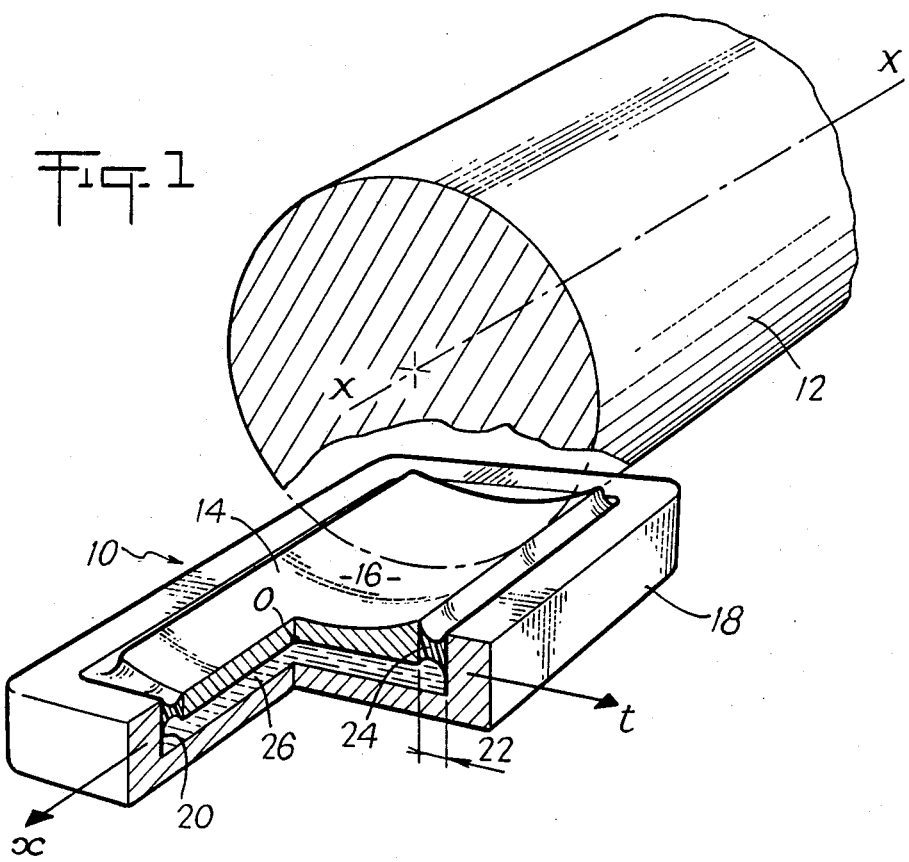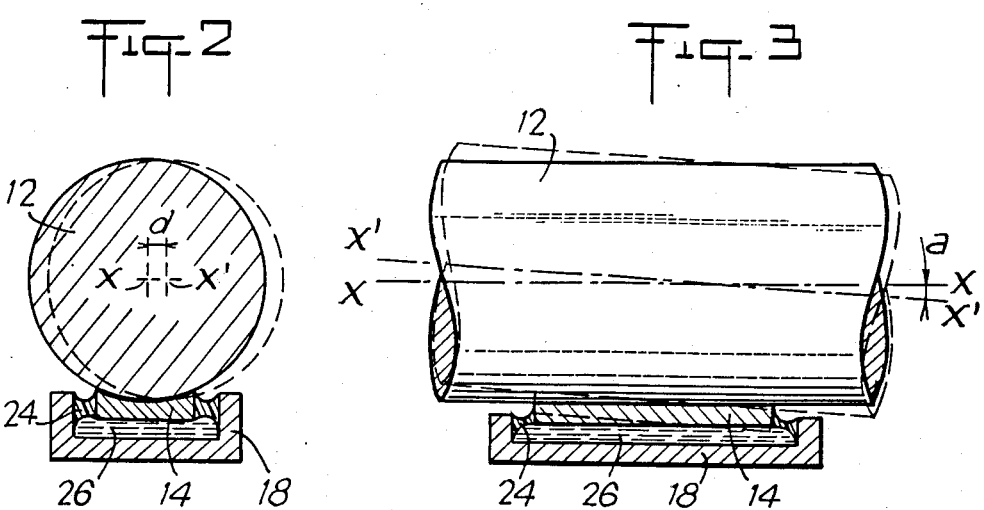

BEARING, SUCH AS FOR ROTARY SHAFT

BACKGROUND OF THE INVENTION

The present invention relates to a bearing, such as a bearing for rotary shaft, and in particular for a large size rotary shaft mounted in a deformable structure such as for example a ship's propeller shaft.

The primary function of such bearings is to support the shaft by taking the radial stresses, while minimizing the resisting friction pairing.

The conventional bearings which have been designed for installations of essentially non-deformable structure are all ill-suited for the applications cited hereinabove, because they do not support any relative deformations of the hull (hence of the structure) and of the shaft.

According to a conventional system, the part on which is defined the friction surface of the bearing, or at least the part of surface most exposed to stresses, is fractionated or split into bearing elements which are more able to follow deformations than one massive piece. Such split-bearings, when used on large-sized rotating machines, improve the hydrodynamic stability of the lubricating film between the friction surface and the shaft.

According to a known variant, this kinematic effect is achieved by means of cylindrical laminates of radius smaller than that of the shaft, and in particular by producing the bearing in two parts, a first part being in contact with the shaft and a second part opposite thereto, both parts contacting together over a cylindrical surface parallel to the shaft and of smaller radius. Thus, the first part of the bearing which is in contact with the shaft has a degree of mobility with respect to the second part by sliding/rotating, thus permitting an accurate orientation of the contacting surfaces and improving lubrication.

These dispositions, however, only permit deformations of very limited amplitude, and although they are relatively well suited for those cases where the axis of the shaft is off-center, they are completely unsuited for cases of angular variations of the axis (non-alignment).

SUMMARY OF THE INVENTION

It is the object of the present invention to overcome the aforesaid drawbacks by proposing a bearing for a rotary shaft, of the type comprising at least one bearing element with a friction surface contacting with one external surface of the shaft, wherein said bearing element comprises a bearing block on which is defined said friction surface and a support housing having an opening for receiving said block, the block and housing being separated over the whole periphery of the opening by a gap, and joined together resiliently through said gap, said block and housing defining together a closed cavity filled with a substantially incompressible fluid.

Understandably, with such a disposition, the bearing block has at least two degrees of mobility with respect to the support housing, within the limits of deformability of the resilient means provided therebetween, which limits may optionally be particularly high.

The invention will be more readily understood on reading the following description with reference to the accompanying drawings.

BRIEF DESCRIPTION OF THE DRAWINGS

FIG. 1 is a diagrammatical view showing in perspective a partial section of a bearing element according to the invention;

FIG. 2 is a diagrammatical cross-section of the bearing element shown in FIG. 1 and of a shaft;

FIG. 3 is a diagrammatical view of a longitudinal section of the bearing element shown in FIG. 1 and of a shaft;

DESCRIPTION OF THE PREFERRED EMBODIMENTS

Figure 4:
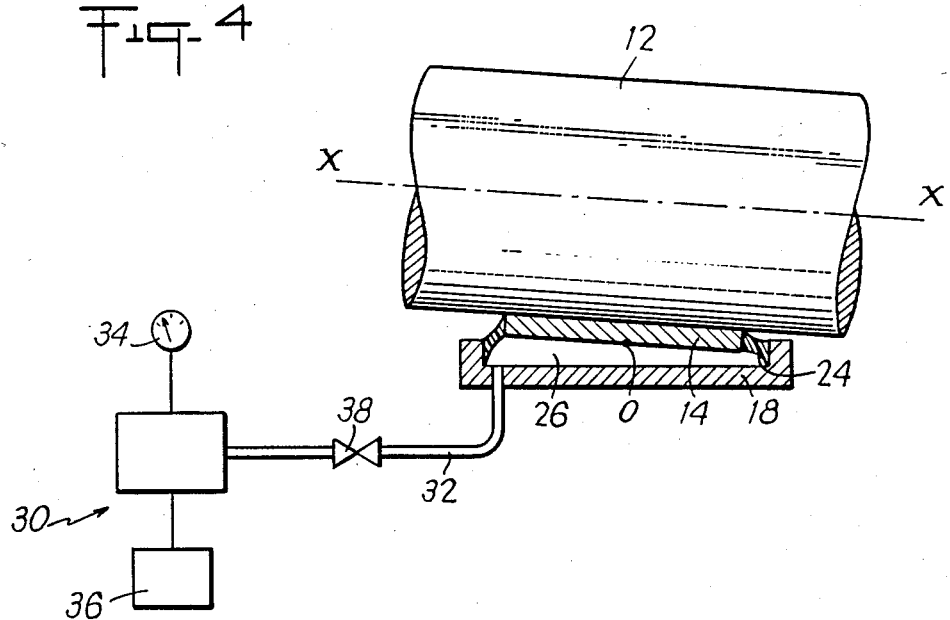
FIG. 4 shows a complementary embodiment of the invention.

Referring to FIG. 1, this shows a bearing element 10 for a rotary shaft 2 which is composed of a bearing block 14 designed to contact with the outer surface of the shaft and is provided to this effect with a concave outer surface 16. Said bearing block may be produced in a wear-resistant material or it may be simply covered with a layer of such material over its concave surface 16. As conventionally known, a lubricating film is deposited between the bearing block and the shaft to reduce frictions when the shaft rotates about its axis XX. The film may be a film of liquid viscous product or it may be a thin layer of solid product, as conventionally used in this particular field.

The bearing block 14 is mounted in a support housing 18 as described hereafter:

The support housing is substantially shaped as a parallelepipedal casing, which is closed on its side faces and on its lower face, and has an opening 20 at its upper face. The bearing block is mounted in the opening 20 in such a way as to leave a free gap 22 all around the opening.

A deformable joint 24 is mounted in said gap 22 between the housing 18 and the bearing block 14. Said joint is solidly fixed to the housing on one side and to the bearing block on the other. Understandably, the joint 24 constitutes a resilient joint between the housing and the block through the gap 22.

Accordingly, the support housing 18, the bearing block 14 and the joint 24 define a closed cavity 26, which is filled with a substantially incompressible fluid. The bearing block thus has two degrees of mobility, by rotating about axes Ox and Ot of FIG. 1, namely to be more precise, one axis parallel to the shaft axis and one axis perpendicular thereto. This allows the bearing block to "follow" the movements of the shaft axis XX.

According to a preferred embodiment of the invention, the joint 24 is produced in an elastomer material and is fixed to the block 14 and to the housing 18 by any suitable adhesive means.

As illustrated in cross-section in FIG. 2, if axis XX moves in parallel to itself over a distance d, the bearing block 14 pivots about axis Ox in such a way that its concave surface 16 remains perfectly in contact with the shaft external surface, the joint 24 deforming resiliently in order to adapt to the new geometry of the gap 22.

As illustrated in longtitudinal section in FIG. 3, if axis XX pivots of an angle a, the bearing block 14 pivots about axis Ot in such a way that its concave surface remains in perfect contact with the outer surface of the shaft, and as in the preceding example, the joint 24 deforms resiliently so as to adapt to the new geometry of the gap 22.

It is also noted, in FIG. 3, that the bearing block has an elongated shape, of a certain length, when considered in parallel to the shaft axis XX. Said block has, as a result, its own resiliency which enables it to incurve by twisting about axis Ot and to adapt to localized irregularities such as bosses on the shaft, or else to compensate for a certain curvature of the axis XX. Indeed, up to this point, it has been assumed that axis XX was perfectly straight, but normally very large size shafts often have a slightly incurved axis due to their own weight, and their own inner resiliency allows them to rotate about such an incurved axis.

According to the embodiment described hereinabove, the cavity between the support housing and the bearing block is completely closed and contains a substantially incompressible fluid. For this reason, the total volume of the cavity remains virtually constant and the rotation movements of the bearing block occur around an instant center of rotation O which is virtually fixed with respect to the housing.

In certain cases, the relative distance of the instant center of rotation O and of the housing is required to vary, namely cases where the bearing block has to be given a third degree of mobility. This is necessary when the axis XX of the shaft shifts in parallel to itself, away from or closer to the bearing element.

To this effect the invention proposes to connect the cavity 26 with a hydraulic control unit 30 via a conduit 32, such unit 30 comprising control means 34 and being in turn controlled by a control unit 36 operationally coupled to detectors (not shown) for detecting the different movements of the shaft axis XX.

In certain cases where the displacements of axis XX remain, during operation, substantially equal to the displacement noted during installation and adjusting time, it is proposed to fit the support housings in adjustable manner, such that they can be adjusted from the start in optimum position and orientation.

As a variant, it is possible to use bearing elements such as illustrated in FIG. 4, the housings being fixedly mounted without any possibility of adjustment, such adjustments being carried out on the quantity of liquid admitted into the cavity 26 by way of a single control unit 30 provided solely for this purpose. On completion of the adjustment of a bearing, said bearing element is isolated by means of a tight valve 38, and the same procedure is repeated with another bearing element using the same unit 30.

Figure 5:
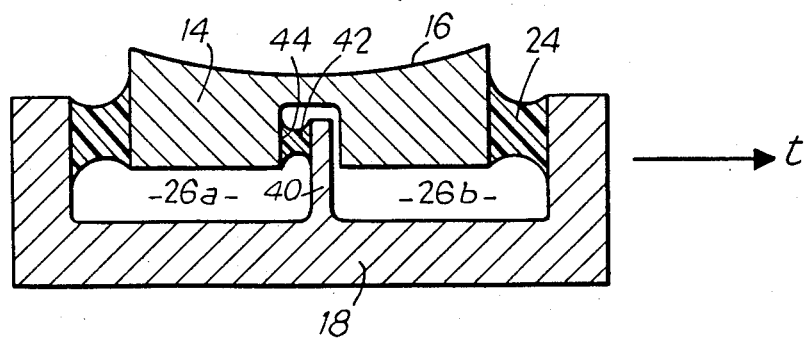
FIG. 5 is a diagrammatical perspective similar to that shown in FIG. 1 illustrating a variant of the invention.

The embodiment illustrated in FIG. 5 differs from the aforedescribed embodiment in that the cavity 26 is subdivided into two sub-cavities 26a and 26b and by a longitudinal wall 40 integral with the housing, a deformable joint 42 being interposed between the wall 40 and an inner surface 44 of the bearing block.

Given that there is no transfer of liquid possible from one sub-cavity to the other, the bearing block only has one degree of mobility, for rotating about axis Ot.

This particular variant is especially applicable in cases where the only deformations possible or noted for the shaft are those where axis XX presents angular variations, such as described with reference to FIG. 3.

It has been assumed heretofore that the incompressible liquid has a negligible viscosity, and therefore the bearing block follows virtually instantaneously the displacements of the shaft axis caused by the deformations of the structure in which the shaft is mounted.

In certain cases, the aim will be to delay and/or to dampen the movements of the bearing block, using to this effect, a fluid having viscoelastic properties or else any material or combination of materials not normally defined as a fluid but found to behave like a visco-resilient fluid when it is received in the closed cavity between the housing and the block.

Also with this particular arrangement, the tightness condition of the connections between the joint and the housing on the one hand and between the joint and the block, on the other, is less critical.

Figure 6:
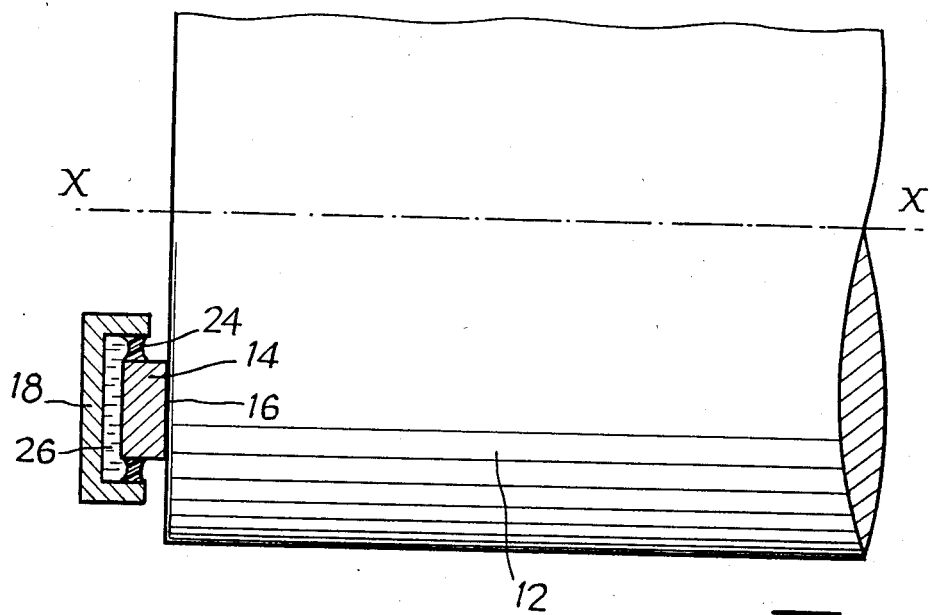
FIG. 6 is a diagrammatical view of a variant of the invention illustrating its use as a thrust bearing.
Figure 7:
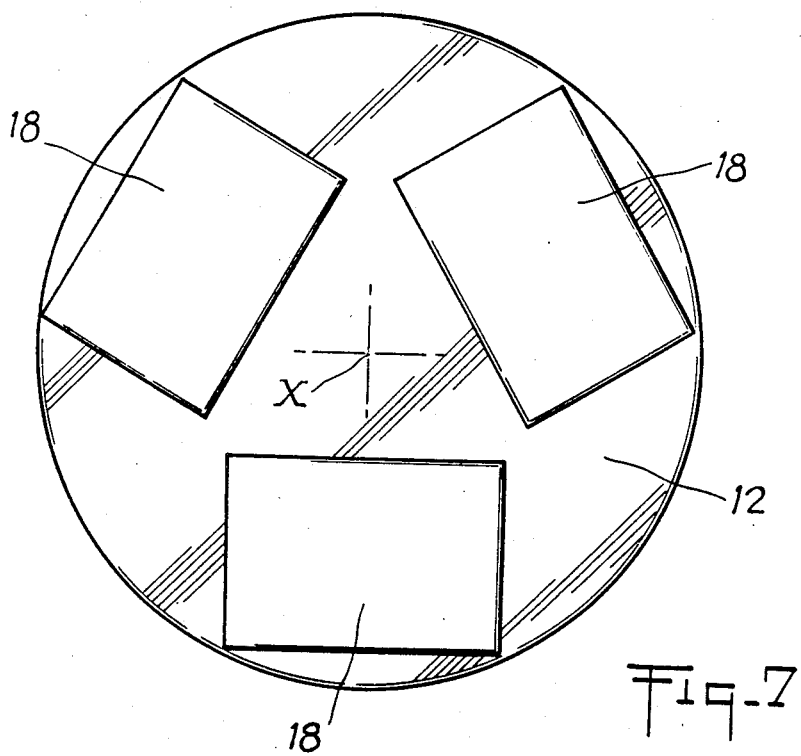
FIG. 7 is an end view of the variant of FIG. 6 illustrating three thrust bearings.

Another possible variant according to the invention, which is illustrated in FIGS. 6 and 7, is the production of thrust bearings, in which the bearing block 14 has a flat external surface 16 contacting with a flat end surface of the rotating shaft.

It is also possible to produce bearings for surfaces working in simple translation, such as bearing pads, where the bearing elements have an external face of shape complementary to that of the facing sliding surface.

Understandably, the invention permits the production of multi-split bearings, formed by a juxtaposition of a plurality of unitary bearing elements such as that described hereinabove, said bearing elements being regularly distributed on the periphery of a rotating shaft, or on a bearing surface, or on a sliding surface. In this construction, each bearing element operates independently from the other bearing elements.

It is noteworthy that the arrangement wherein each bearing element is comprised of a single block received in an individual support housing permits the bearing element to withstand high loads, as is the case in the contemplated application, owing to a high radial stiffness resulting from the aforedescribed structure.

Finally, should it be necessary to replace a faulty bearing block, it is sufficient to replace a single bearing element, without need to remove nor replace the other bearing elements which together constitute the bearing.

Numerous alterations and modifications of the structure herein disclosed will suggest themselves to those skilled in the art. It is to be understood, however, that the present disclosure relates to the preferred embodiments of the invention which is for purposes of illustration only and is not to be construed as a limitation of the invention. All such modifications which do not depart from the spirit of the invention are intended to be included within the scope of the appended claims.

What is claimed is:

1. Bearing for rotary shaft, of the type comprising a plurality of bearing elements each having a friction surface contacting with one external surface of the shaft, each of said bearing elements comprising a bearing block on which is defined said friction surface and a support housing having an opening for receiving said block, the block and housing being separated over the whole periphery of the opening by a gap, and joined together resiliently through said gap, said block and housing defining together a closed cavity filled with a substantially incompressible fluid wherein the resilient joining between the block and the housing is achieved by an elastomer material filling said gap and adhesively joined to the block on the one hand and to the housing on the other and wherein each of the bearing elements is a separate unit which operates independently from each of the other bearing elements.

2. Bearing according to claim 1, wherein said cavity is sub-divided into two separate sub-cavities.

3. Bearing according to claim 1, wherein the bearing block is elongated in shape and has its own resiliency.

4. Bearing according to claim 1, designed to be disposed radially with respect to a shaft, wherein said bearing block has a concave surface designed to be in contact with an external cylindrical surface of said shaft.

5. Bearing according to claim 1, designed to be in abutting contact with the shaft, wherein the bearing block comprises a flat surface designed to contact with a flat end surface of said shaft.

6. Bearing according to claim 1, wherein said bearing element is operationally coupled to a hydraulic control unit communicating with said cavity and under the control of a control unit.

7. Bearing according to claim 1, wherein said fluid has visco-resilient properties.

8. Bearing for rotary shaft, of the type comprising a plurality of bearing elements each having a friction surface contacting with one external surface of the shaft, each of said bearing elements comprising a bearing block on which is defined said friction surface and a support housing having an opening for receiving said block, the block and housing being separated over the whole periphery of the opening by a gap, and joined together resiliently through said gap, said block and housing defining together a closed cavity filled with a substantially incompressible fluid wherein the resilient joining between the block and the housing is achieved by an elastomer material filling said gap and adhesively joined to the block on the one hand and to the housing on the other, said cavity being sub-divided into two separate sub-cavities by a partition wall integral with the housing and having a joint of elastomer material being interposed between said partition wall and the bearing block.

* * * * *